United States Patent
Bergeron, deceased

[15] 3,652,415
[45] Mar. 28, 1972

[54] LUBRICATING COMPOUND

[72] Inventor: Frank E. Bergeron, deceased, 4818 Fairlawn Drive, late of La Canada, Calif. 91011 by Katharine S. Bergeron, executrix

[22] Filed: Jan. 6, 1969

[21] Appl. No.: 789,424

[52] U.S. Cl.................................252/36, 252/37.2, 252/39, 252/41
[51] Int. Cl. .........................................................C10m 5/22
[58] Field of Search..................252/39, 36, 37.2, 48.6, 48.2, 252/41

[56] References Cited

UNITED STATES PATENTS

| | | |
|---|---|---|
| 2,065,248 | 12/1936 | Smith........................................252/19 |
| 2,295,189 | 9/1942 | Swenson..................................252/36 |
| 2,543,741 | 2/1951 | Zweifel.....................................252/19 |
| 2,790,770 | 4/1957 | Fainman et al. .........................252/36 |
| 2,818,386 | 12/1957 | Francis et al. ..........................252/33.2 |
| 2,888,402 | 5/1959 | Nelson......................................252/40 |
| 3,003,962 | 10/1961 | Jordan et al. ...........................252/36 |
| 3,396,108 | 8/1968 | Caruso.....................................252/18 |

*Primary Examiner*—Daniel E. Wyman
*Assistant Examiner*—I. Vaughn
*Attorney*—Fulwider, Patton, Rieber, Lee & Utecht

[57] ABSTRACT

A lubricating compound for use in extreme pressure environments comprising, in one embodiment, a major amount of a base lubricating agent and a minor amount, but at least about 1 percent by weight, of a fish oil-based lead soap. The base lubricating agent includes calcium complex grease, barium grease, aluminum grease, sodium grease and lithium grease. The fish oil in the lead soap includes tuna oil, herring oil, menhaden oil and sardine oil.

10 Claims, No Drawings

LUBRICATING COMPOUND

BACKGROUND OF THE INVENTION

This invention relates to lubricants and, more particularly, to extreme pressure greases employed to reduce wear on moving parts subjected to frictional wear.

To reduce friction and to protect the contacting surfaces in, for example, mechanical bearings, anti-friction bearings and journals, lubricants such as viscous oils and greases are applied to the contacting surfaces. These lubricants must themselves withstand the extreme pressure exerted on them by the contacting surfaces without substantially losing their lubricating qualities and, in addition, eliminate or limit any scarring of the contacting surfaces. These characteristics of a good lubricant are not necessarily interdependent. That is, a lubricant which can withstand high loads may permit severe scarring of the surfaces which it seemingly protects, even at loads which are insufficient to cause the lubricant to break down.

Generally, improvements in lubricants have been made by concentrating on improving the pressure or load bearing properties of the lubricant itself. While this is a desirable goal, it is equally important to limit the extent of scarring permitted by the lubricant at pressure which the lubricant itself can withstand.

The effect of using presently-available lubricants for anti-wear purposes is that, while the lubricant itself usually adequately withstands the pressures to which it is subjected, the underlying surfaces are significantly scarred. This may require immediate and costly replacement of parts. Furthermore, if such scarring is allowed to continue, the components supposedly protected by the lubricant will fail and may cause substantial additional damage and/or injury.

SUMMARY OF THE INVENTION

This invention is embodied in a lubricating composition comprising, in a first embodiment, a major amount of a base lubricating agent to which has been added a minor amount of a fish oil-based lead soap. More specifically, a presently-preferred, first embodiment of this invention comprises: (a) a base grease selected from the group consisting of aluminum grease, calcium complex grease, barium grease, lithium grease, and sodium grease and (b) a fish oil-based lead soap. The fish oil in the fish oil-based lead soap includes tuna oil, sardine oil, menhaden oil and herring oil. This presently-preferred lubricating composition contains about 99 to about 85 percent by weight of the base grease and about 1 to about 15 percent by weight of the fish oil-based lead soap.

A preferred modification of this composition contains, in addition, a minor amount of a sulfur modified sperm oil. The modified sperm oil is one of the group of sulfurized sperm oil and sulfonated sperm oil and is present in amount between about 0.5 percent by weight to about 7.5 percent by weight of the lubricating composition.

The combination of a base lubricating agent and a fish oil-based lead soap exhibits some increase in load-bearing capabilities, i.e., Timken pass load, over the base lubricating agent. This combination also permits only a relatively small increase in scar area of the underlying surfaces which it lubricates, at its pass load, as compared with the base lubricating agent at the latter's lower pass load. Additionally, the scar area increase is substantially lower than that permitted by other lead soaps such as lead oleate and lead naphthenate. Furthermore, it substantially increases the gelling or hardening of the base lubricating agent and thereby decreases or eliminates any tendency of the components to separate so that less of the gelling agent usually present need be used. This latter advantage can effect a substantial economic saving by the reduction of the amount of gelling agent normally required while, simultaneously, providing the aforementioned improved load bearing and inhibition of scar growth characteristics.

When a sulfur modified sperm oil and, particularly, sulfurized sperm oil, is added to the base lubricating agent and fish oil-based lead soap, additional and substantial advantages are provided. This modification produces a synergistic effect which is manifested in a very substantial increase in load-bearing capability as compared with the base lubricating agent. Additionally, the scar area on the underlying surfaces increases substantially less than the increase in load-bearing capability and substantially less than when the same load-bearing test is run with other similar greases, but with the fish oil-based lead soap replaced by, e.g., lead naphthenate. These advantageous results are also accompanied by an increase in the hardening of the grease, thereby, as previously mentioned, permitting the formulation of a less expensive grease.

DESCRIPTION OF THE PREFERRED EMBODIMENT

This invention is embodied in a lubricating composition which, in a first embodiment, includes (a) a major portion of a base lubricating agent and (b) a minor portion of a fish oil-based lead soap. More specifically, the base lubricating agent presently preferably comprises a grease selected from aluminum, calcium complex, lithium, barium and sodium greases. A presently-preferred modification of this invention further includes (c) a minor amount of a sulfur modified sperm oil fat such as sulfurized sperm oil and sulfonated sperm oil.

In the presently-preferred form of the first embodiment, the amount of fish oil-based lead soap is at least 1 percent by weight of the total composition and, preferably is less than 15 percent by weight. In the preferred modified embodiment, the amount of fish oil-based lead soap is at least 1 percent by weight of the total composition and, preferably, less than about 15 percent by weight, and the sulfur modified sperm oil is present in amounts constituting at least about 0.5 percent by weight of the total modified composition and, preferably, constituting less than about 7.5 percent by weight. In each composition, the preferred base grease is present in amounts sufficient to make 100 percent by weight of the total composition.

Hereafter, all amounts given in percent are percent by weight of the total composition unless otherwise stated and, in any case, are percent by weight.

Both embodiments of this invention exhibit increased load-bearing capabilities and this increase is accompanied by a relatively smaller increase in scar area as compared with other lead soap greases. The compounds of this invention also exhibit an increased hardness which is quite unexpected in view of the softening of other greases containing lead soaps other than those employed herein. In particular, the modified embodiment of this invention exhibits an increase in load bearing capability relative to the attendant scar area increase which is synergistic. The reasons for these improved results are not presently known, but they have been experimentally produced as will be described hereafter.

The components of the compositions of this invention will now be described in detail. The base lubricating agent may be a viscous oil alone, for example, an SAE 90 gear oil base stock, or it may be a semi-solid grease comprising an oil and a gelling agent. The oil in the grease may be any suitable oil such as a polymerized butylene, a synthetic oil such as dioctyladipate, or other oleagenous fluid commonly used in lubricants, but is preferably a mineral oil. Combinations of these oils may also be used. The preferred mineral oil is preferably a neutral type hydrocarbon oil having a Saybolt Universal viscosity at 100° F. in the range between about 100 and about 500 seconds (S.U.S.). Useful mineral oils well-known in the grease-making art includes, for example: pale oil, red oil, process oil, neutral oil, floor oil, brown neutral oil, neutral distillate, treated neutral oil, and blends of these mineral oils from any petroleum source. These oils may contain bright stocks or other hydrocarbon materials capable of modifying the physical characteristics of the neutral oils.

Preferably, the gelling agent is a metallic soap. However, it may also be an inorganic thickening agent such as processed clays or salicious materials, for example Bentone 34 and Cab-O-Cil. The metallic soap may not be normal calcium soap or lead soap, but it may be aluminum, calcium complex, lithium, barium, or sodium soap. A particularly useful metallic soap is aluminum stearate soap. As used herein, the term "soap" is intended to include compounds formed from the combination of metal elements or inorganic elements with animal or vegetable fats, fatty acids or fatty acid derivatives as well as certain petroleum derivatives such as oxidized petroleum.

The presently-preferred combination of a mineral oil and a metallic soap are employed in a ratio of mineral oil to soap between about 10:1 and about 19:1 by weight. The amount of base lubricating agent in the compounds of this invention is an amount sufficient to make 100 percent by weight of the compound when added to the other components.

The fish oil-based lead soap, which is an extreme pressure agent, comprises: (a) a petroleum or mineral oil base derived from the combination of a bright stock having a viscosity between about 110 SUS (Saybolt Universal Seconds) and about 250 SUS at 210°F. and a neutral oil having a viscosity between about 100 SUS and about 500 SUS at 100° F.; (b) a fish oil including herring oil, menhaden oil, sardine oil, mackerel oil, anchovy oil, and, preferably tuna oil; and (c) lead, preferably derived from litharge (PbO).

An example of an effective fish oil-based lead soap has the following composition:

| | |
|---|---|
| Mid Continent Bright Stock (200 SUS at 210° F.) | – 37.0 lb. |
| Tuna oil | – 107.5 lb. |
| 30–P oil (300 SUS at 100° F.) | – 147.0 lb. |
| Litharge | – 86.0 lb. |

The weight fractions of the components present in the fish oil-based lead soap are selected so that the tuna oil is miscible with the other oils and so that the resulting lead soap has a semi-solid or semi-plastic consistency. The preferred consistency is about 170–200 penetration at 77° F. depending to some extent on the particular fish oil used as determined by a standard A.S.T.M. grease penetrometer.

The fish oil-based lead soap is made by first mixing the litharge and the bright stock together to form a paste. Heating of this paste is commenced and the tuna oil is added with stirring. Heating is continued until the temperature of the mix rises above about 300° F. and, preferably, to a temperature between about 300° F. and about 320° F. When this elevated mix temperature has been reached, the low viscosity neutral oil is slowly added to thin the mix. The temperature of the mix is maintained above about 300° F. during the entire addition of the neutral oil. If the mix temperature falls below about 300° F. the desired reaction will not be satisfactorily completed. Heating of the mix is continued until substantially all of the litharge has reacted.

As previously mentioned, it is preferred to add a sulfur modified sperm oil to the first embodiment comprising a base lubricating agent and a fish oil-based lead soap. The sulfur modified sperm oils comprise the sulfurized and sulfonated sperm oils, the sperm oils themselves being esters of higher molecular weight aliphatic alcohols.

The fish oil-based lead soap is present in both embodiments of this invention in a minor amount of at least about 1 percent and, preferably, in an amount less than about 15 percent by weight. Below about 1 percent, the lead soap is too diluted to be effective. Amounts of fish oil-based lead soap in excess of 15 percent may be used. However, above about 15 percent, the cost of additional amounts of lead soap is not offset by the slight improvement produced. Higher concentrations can also result in improper application at low temperatures and can also prevent proper performance of the lubricant because of the inability of the composition to flow to the areas to be lubricated and/or because of the release of fluid lubricant from the gell structure.

The modified sperm oil is present in a minor amount of at least about 0.5 percent and, preferably, less than about 7.5 percent. Below about 0.5 percent, the sperm oil is ineffective, i.e., no synergistic result is produced. Above about 7.5 percent, the further addition of sperm oil produces only slight improvements which do not offset the cost of additional sperm oil.

To prepare the compounds of this invention, various mixing methods may be used. For example, at present, the base grease is added to a standard grease mixer. Thereafter, the lead soap is poured into the mixer and thoroughly mixed with the base grease. If the lead soap has hardened upon standing after being made, it is first heated to make it pourable before adding it to the base grease. The sperm oil is added to the resulting mix with stirring to make the final product which is a semi-solid having a characteristic grease consistency.

The advantages obtained by compounds of this invention will now be illustrated by the following Examples.

EXAMPLE I

A base grease was made up comprising 7.25 percent by weight aluminum stearate soap and 92.75 percent by weight neutral mineral oil having a viscosity of 300 S.U.S. at 100° F. A tuna oil-based lead soap was made up comprising: 9.8 percent mid continent bright stock (Saybolt viscosity at 210° F. — about 200 S.U.S.); 38.9 percent 300 neutral west coast stock (Saybolt viscosity at 100° F. — about 300 S.U.S.); 28.5 percent tuna oil; and 22.8 litharge. This lead soap contains 21.1 percent lead. Lead naphthenate soap was made up comprising: 26.9 percent 100 neutral west coast stock (Saybolt viscosity at 100° F. — about 300 S.U.S.); 46.5 percent naphthenic acid; and 26.6 percent litharge. This lead naphthenate contains 25.0 percent lead.

Compounds were then formulated from the above-described lead soaps and aluminum stearate grease, and from sulfurized and sulphonated sperm oil as shown in Table 1.

TABLE 1

| | Percent by weight | | | | | | |
|---|---|---|---|---|---|---|---|
| Compound designation | A | B | C | D | E | F | G |
| Base grease | 100 | 90 | 95 | 85 | 90 | 85 | 85 |
| Tuna oil-based lead soap | | 10 | | 10 | | | 10 |
| Lead naphthenate soap | | | | | 10 | 10 | |
| Sulfurized sperm oil | | | 5 | 5 | | 5 | |
| Sulphonated sperm oil | | | | | | | 5 |

Compounds A and C are references. Compound B represents the first embodiment of this invention and compounds D and G represent the modified embodiment of this invention. Compounds E and F are the same as compounds C and D of this invention, respectively, except that lead naphthenate soap has been substituted in the former compounds for the tuna oil-based lead soap of the latter compounds.

Each of these compounds (A through G) was subjected to the same test to show the breakdown load of the grease and to show the degree of protection afforded to underlying metal surfaces prior to breakdown of the grease. The scar length was a constant in each case of 0.5 inch.

The results of this test are summarized in Table 2. In comparing the compounds of this invention (B, D, and G) with compounds E and F, it is to be remembered that compounds E and F contain more (about 20 percent) of the extreme pressure agent lead than do compounds B, D and G. Thus, the improvements shown in Table 2 for compounds B, D and G would actually be greater than shown if these compounds contained the same amount of lead as compounds E and F.

TABLE 2

| Compound | Lever Load, lb. | | Scar area, in.² | Pass Load, percent increase (a) | Scar Area, percent increase (b) | (a)/(b) |
|---|---|---|---|---|---|---|
| | Pass | Fail | | | | |
| A | 15 | 20 | 0.0235 | Base | Base | |
| B | 20 | 25 | 0.0270 | 33 | 14.9 | 2.2 |
| C | 20 | 25 | 0.0245 | 33 | 4.2 | 7.9 |
| D | 45 | 50 | 0.0355 | 200 | 51.1 | 3.9 |
| E | 35 | 40 | 0.0450 | 133 | 91.4 | 1.5 |
| F | 40 | 45 | 0.0425 | 167 | 80.4 | 2.1 |
| G | 40 | 45 | 0.0410 | 167 | 74.4 | 2.2 |

As is evident from Table 2, the first embodiment of this invention which comprises a base lubricating agent and a fish oil-based lead soap and which is represented by compound B provides a 33 percent increase in the pass load and produces only a 14.9 percent increase in scar area over the base grease (A). Although the pass load increase is not large, its gain relative to the increase in scar area (2.2) is significant, thus making this compound (B) very useful in relatively low load applications. By comparison, the same compound, but formulated with a different lead soap (lead napththenate) (E) produced a substantially higher pass load than the base grease (133 percent increase). However, this substantial increase in pass load was accompanied by a substantial increase in scar area so that its increase in pass load relative to the accompanying scar area increase was only 1.5, that is, substantially less than for compound B.

The superior results produced by the modified embodiment of this invention which comprises a fish oil-based lead soap and a sulfur modified sperm oil and which is represented by D are clearly shown in Table 2. The use of compound D results in a 200 percent increase in pass load and this is accompanied by only a 51.1 percent increase in scar area, a ratio of pass load increase to scar area increase of almost 4:1. By comparison, a similar compound (F) compounded with a lead naphthenate soap produced only a 167 percent increase in scar load and this was accompanied by a large scar area increase of 80.4 percent, a ratio of only about 2:1.

The synergistic effect of the combination of the fish oil-based lead soap and sulfurized sperm oil is clearly shown by comparing the test results obtained using compound D with those obtained using compounds B and C. Both compounds B and C produce only a relatively small increase in pass load (33 percent) with an accompanying small increase in scar area (14.9 percent and 4.2 percent, respectively). By comparison, the combination of the fish oil-based lead soap and sulfurized sperm oil (D) produces a sixfold (500 percent) increase in pass load accompanied by only a relatively low scar area increase. This synergistic effect is to be compared to the only slight effect produced by the addition of sulfurized sperm oil to the combination of base grease and lead naphthenate soap as shown by comparing the test results from compounds E and F. Compound F (with sulfurized sperm oil) shows only a small increase (about 22 percent) in pass load and only a small improvement in scar area over compound E (without sulfurized sperm oil). From the foregoing, it will be seen that the effect of combining the fish oil-based lead soap of this invention and sulfurized sperm oil is synergistic and that the result is the formation of a superior, extreme pressure lubricant.

A similar, although somewhat lessened effect, is produced using sulfonated sperm oil in place of sulfurized sperm oil as in compound G. A comparison of the compound G test results with those obtained from testing compounds B and C shows that a synergistic effect is provided by the addition of sulfonated sperm oil to compound B. A fivefold (400 percent) increase in pass load is produced and this is accompanied by a moderate increase in scar area which is larger than the scar area increase produced by compound D, but less than that produced by compound F, both of which contain sulfurized sperm oil.

EXAMPLE II

Substantial improvements in the gelation or hardening of various base lubricating agents are also provided by the addition to these agents of the fish oil-based lead soaps and sulfur modified sperm oils of this invention. To illustrate this, penetration tests were run on two aluminum stearate base greases and on these base greases after various combinations of fish oil-based lead soap, lead naphthenate soap, lead oleate soap, and sulfurized and sulfonated sperm oil were added thereto. The test apparatus was a standard A.S.T.M. worker and all penetrations were measured at 77° F.

The base greases comprised 7.25% (K) and 8.0% (L) aluminum stearate soap with the remaining constituent being a mineral oil having a Saybolt viscosity of 300 S.U.S. at 100° F. The penetration of each of these greases was measured in both the unworked and worked condition after being made up and in the unworked condition 7 days after the initial tests. Thereafter, various compounds were made up as follows:

M = tuna oil-based lead soap described in Example I.
N = lead naphthenate soap described in Example I.
P = lead oleate soap containing 33.4 percent mineral oil (S.U.S. at 100° F. = 300), 50 percent oleic acid and 16 percent litharge (10.3 percent lead)
R = sulfurized sperm oil Each of compounds M, N. P and R was added to tested base greases K and L as shown in Table 3. In each case, the amounts of each of M, N and P represented 10 percent by weight of the total compound and the amount of R represented 5 percent by weight of the total compound. The penetration of each of the resulting compounds was again measured after an additional 7 days. The results are shown in Table 3.

TABLE 3

| Penetration at 77° F. | Base | | M | | N | | P | | R | | R+M | |
|---|---|---|---|---|---|---|---|---|---|---|---|---|
| | K | L | K | L | K | L | K | L | K | L | K | L |
| Unworked | 310 | 200 | | | | | | | | | | |
| Worked | 330 | 240 | | | | | | | | | | |
| Unworked after 7 days | 272 | 218 | | | | | | | | | | |
| Unworked after 7 days after addition | | | 222 | 160 | 274 | 251 | 289 | 279 | 237 | 205 | 221 | 200 |
| Percent gain (+) or loss (−) in penetration | | | +18 | +27 | −0.7 | −15 | −6.3 | −28 | +13 | +5.9 | +19 | +8.3 |
| Percent aluminum stearate soap equivalent of penetration | | | +0.7 | +0.8 | −0.03 | −0.5 | −0.2 | −0.9 | +0.5 | +0.2 | +0.7 | +0.2 |

As shown in Table 3, col. 2, the addition of 10 percent of tuna oil-based lead soap (M) to either base grease (K or L) produces a substantial gellation or hardening of the grease. The penetration decreased (hardness increases) from 272 and 218 to 222 and 160, respectively, producing a gain in hardness of about 18 percent and 27 percent, respectively. This increase in hardness is equivalent to the inclusion in the base grease of an additional 0.7 percent and 0.8 percent of aluminum stearate soap. That is, the addition of this lead soap results in an aluminum stearate soap effective increase to 7.95 percent and 8.8 percent from 7.25 percent and 8.0 percent, respectively. Translated into a savings in aluminum stearate soap, this is a savings of 6.9 lb. and 7.9 lb., respectively, per 1,000 lb. of grease. This hardening of the base grease is unexpected since other lead soaps soften the base grease as shown in Table 3 by lead naphthenate (N) and lead oleate (P) (col. 3 and 4). Both of these soaps cause a softening of the base greases which would necessitate the addition of aluminum stearate soap (or other thickeners) to bring the base grease back up to its original hardness.

Sulfurized sperm oil (R) also produces a hardening of the base grease (Table 3, col. 5) although the increase in hardness is less than that provided by the tuna oil-based lead soap alone. For example, the penetration of the 7.25 percent aluminum stearate grease (K) is reduced from 272 to 237 by the addition of 5 percent of sulfurized sperm oil, a gain in consistency of 13 percent. This improvement is further increased by the addition of the tuna oil-based lead soap (Table 3, col. 6). For example, the addition of 10 percent tuna oil-based lead soap and 5 percent sulfurized sperm oil to the 7.25 percent aluminum stearate grease (K) provides a reduction in penetration from 272 to 221, a gain in consistency of 19 percent.

Thus, from Example 2, it will be seen that a beneficial and unexpected hardening of the base grease occurs when either the fish oil-based lead soap of this invention or the latter in combination with sulfurized sperm oil is added to a base grease of this invention.

EXAMPLE III

This example illustrates the effectiveness of the combination of a fish oil-based lead soap and sulfurized sperm oil in combination with greases other than aluminum stearate grease.

A series of commercial base greases were made up with each grease comprising a west coast neutral oil of the following general limits (density 23°–25° API; viscosity 300–420 S.U.S. at 100° F. and about 46 S.U.S. at 210° F.) and a soap selected from the group of calcium, calcium complex, barium, lithium and sodium soaps. Penetration tests were run on each of these greases after being made up, in the unworked and worked condition, and after seven days (unworked). Thereafter, the aforedescribed tuna oil-based lead soap in amount equal to 10% by weight of the finished grease and sulfurized sperm oil equal in amount to 5 percent by weight of the finished grease were added together to each of the above base greases. The penetration of the resulting compound was measured after an additional 7 days (unworked). The results are shown in Table 4.

TABLE 4

| Penetration at 77° F. | Base grease | | | | |
|---|---|---|---|---|---|
| | Calcium | Calcium complex | Barium | Lithium | Sodium |
| Unworked | 268 | 265 | 280 | 292 | 255 |
| Worked | 298 | 267 | 275 | 283 | 275 |
| Unworked after 7 days | 279 | 265 | 275 | 277 | 259 |
| Unworked 7 days after addition | 320 | 195 | 208 | 219 | 193 |
| Percent gain (+) or loss (−) in consistency | −15 | +26 | +24 | +21 | +66 |

As will be seen from Table 4, the fish oil-based lead soap and the sulfurized sperm oil, when used in combination with calcium complex, barium, sodium and lithium greases, produce a hardening of the base grease. For example, calcium complex grease having a penetration of 265 (unworked) after 7 days was hardened to a penetration of only 195 (unworked) 7 days after the addition of the fish oil-based lead soap and sulfurized sperm oil, an increase in hardness of 26 percent. This improvement in hardness associated with calcium complex, barium, sodium and lithium greases was not observed with calcium base grease. Instead, the addition of the fish oil-based lead soap and sulfurized sperm oil to the calcium grease caused a substantial softening of the base grease.

What is claimed is:

1. An extreme-pressure lubricating compound comprising an oil thickened to a grease consistency with a metallic stearate soap selected from the group consisting of aluminum stearate soap, barium stearate soap, calcium complex stearate soap, lithium stearate soap, and sodium stearate soap; and containing a synergistic, extreme-pressure proportion of:
   a. a fish oil lead soap, and
   b. a sulphur-modified sperm oil selected from the group consisting of sulfurized sperm oil and sulfonated sperm oil.

2. The lubricating compound of claim 1 wherein the fish oil in the fish oil lead soap is selected from the group consisting of tuna oil, herring oil, menhaden oil, anchovy oil, mackeral oil and sardine oil.

3. The lubricating compound of claim 2 wherein the oil which is thickened to a grease consistency is mineral oil.

4. The lubricating compound of claim 3 containing from about 1 percent to about 15 percent by weight of the fish oil lead soap.

5. The lubricating compound of claim 4 containing from about 0.5 to about 7.5 percent by weight of the sulfur-modified oil.

6. An extreme-pressure lubricating compound comprising an oil thickened to a grease consistency with an aluminum stearate soap and containing a synergistic, extreme-pressure proportion of:
   a. a fish oil lead soap, and
   b. a sulphur-modified sperm oil selected from the group consisting of sulfurized sperm oil and sulfonated sperm oil.

7. The lubricating compound of claim 6 wherein the fish oil in the fish oil lead soap is selected from the group consisting of tuna oil, herring oil, menhaden oil, anchovy oil, mackeral oil, and sardine oil.

8. The lubricating compound of claim 7 wherein the oil which is thickened to a grease consistency is mineral oil.

9. The lubricating compound of claim 8 containing from about 1 percent to about 15 percent by weight of the fish oil lead soap.

10. The lubricating compound of claim 9 containing from about 0.5 to about 7.5 percent by weight of the sulfur-modified oil.

* * * * *